Patented Aug. 23, 1938

2,127,664

UNITED STATES PATENT OFFICE 2,127,664

SEPARATING BROOKITE AND RUTILE FROM ZIRCON AND OBTAINING TITANIUM OXIDE THEREFROM

Charles J. Kinzie and Eugene Wainer, Niagara Falls, N. Y., assignors to The Titanium Alloy Manufacturing Company, New York, N. Y., a corporation of Maine No Drawing. Application August 29, 1936, Serial No. 98,598

12 Claims. (Cl. 23—202)

Our invention relates to improved methods for the recovery of titanium minerals from therewith entangled zirconium ores, more particularly the separation of brookite and rutile grains from zircon or zirconium silicate, as well as to the production of a new composition of matter in the form of a synthetic titanium oxide.

Titanium oxide minerals such as rutile and brookite are practically always associated with zirconium silicate ($ZrSiO_4$), particularly in case of beach sand occurrences of zircon.

Even though the minerals occur in the form of separate grains, it has been found difficult, and in many cases impossible, to obtain a titanium oxide mineral therefrom containing over 90% $TiO_2$.

Particularly is this the case in some of the largest and most important zircon deposits which contain along with the zircon sand substantial amounts of ilmenite, magnetite, chromite, and a high percentage of brookite and rutile. The magnetic minerals such as magnetite, ilmenite and chromite are almost completely removed by passing the well washed sand over an ordinary induction magnetic separator, after the free quartz has been removed by wet tables or by other suitable means.

In the subject matter of our present invention, the non-magnetic discharge contained about 70% zircon, and contrary to the findings of mineralogists, the remainder consisted of practically iron-free crystals of brookite and rutile.

Special high intensity induction magnetic separators will remove about 40 to 60% of all the zircon present in relatively pure form, but repeated passes fail to separate the zircon completely from the brookite and rutile.

We have now discovered that some of the zircon is more magnetic than some of the brookite and rutile, part of the zircon being of about equal magnetic susceptibility, and a part so slightly less as to render mechanical separation too slow and tedious a process.

These sands have been worked mainly for zircon, and we have found that in obtaining the zircon, only a part has been recovered, leaving not only a substantial part of the zircon, but practically all the low iron titanium oxide minerals as a waste product, due to the inability to obtain satisfactory separation.

Since it is of great advantage to obtain practically all the zircon, as well as the associated relatively pure brookite and rutile, in usable form, and since heretofore it has been impossible to accomplish this end by known methods, extensive researches were conducted by us into ways and means of so altering the properties of one or the other mineral in order that separation could be accomplished, and furthermore that these two useful mechanically free but inseparable minerals should be put into form for use in the industries.

In the course of our researches, we discovered that if the intimate and commingled mixture composed substantially of industrially inseparable grains of magnetically similar titanium oxide minerals and zircon were heated in a reducing atmosphere in presence of carbon at temperatures of from about 1400° C. to 1600° C., the zircon remained unaffected while the titanium oxide minerals were completely altered.

Heretofore the untreated brookite and rutile crystals were shiny solid grains. Our improved methods have resulted in a complete transformation of these crystal grains into velvety fissured, partially split grains, which, upon calcination in air at about 700 to 900° C., yielded the titanium oxide material in the form of tan colored grains that could then be separated from the essentially unaltered zircon by any one of several methods, for example, by passing over a wet ore concentrating table, where the titanium oxide flows away from the zircon into a clean buff-colored band so as to leave the zircon with but little remaining titanium oxide.

Such transformation has rendered the grains of titanium oxide minerals very friable and easily ground, while the zircon still remains in the form of essentially unaltered crystals of $ZrSiO_4$; hence it is possible to separate by selective milling, for example, such separation has been accomplished by placing the mixture in a ball jar with rubber balls and rotating at about 50 R. P. M., which treatment resulted in the titanium oxide product being reduced to a powder which could be screened away from the still unaffected crystals of zircon.

By either of the above methods, titanium oxide products have been recovered representing 80 to 90% of the low iron brookite and rutiles in the original sand in sand form as to contain 90 to 95% TiO$_2$ about 0.10% Fe$_2$O$_3$, with the balance ZrSiO$_4$ and SiO$_2$.

In order to illustrate the great difference between the properties of titanium minerals as originally existing in the sand in contrast with the properties of the recovered titanium oxide, we will present the following comparison:—

A small amount of brookite-rutile recovered in 91.0% TiO$_2$ form by about 40 passings over a high intensity magnetic separator was used in comparison with a sample of the altered titanium oxide recovered from part of the same sand by our methods of heating with carbon and oxidizing, etc.

The following table will show the fundamental changes which have occurred, the altered product in this case being one recovered by wet gravity table separation.

| | Unaltered | Altered |
|---|---|---|
| TiO$_2$ content | 91.0 | 90.6. |
| Color | Black-mainly | Tan. |
| Mean crystal size | 142 to 243 microns | 1 micron down to 0.10 micron and finer possibly. |
| Apparent specific gravity | 2.63 | 1.83. |
| Specific gravity, 4° C | 4.271 | 3.887. |

The very definite lowered specific gravity as well as the greater buoyancy due to the multitude of fissures in the altered grain, now consisting chiefly of very fine crystals of a size less than 0.5 micron, explain the ease with which the altered product may be separated from the zircon.

The properties of the titanium oxide product are definitely those of anatase, the specific gravity being practically the same as given for anatase.

By suitable disintegration to produce a fine product from the recovered titanium oxide, a material useful as a pigment may be obtained where whiteness is not important. In enamels, glazes and ceramic bodies, it should prove useful as a stain.

It may be useful as a welding flux, and also as a coating for welding rods, and if the density is not high enough, this can be increased and high specific gravity restored by calcination at a higher temperature, for example from 1000° to 1200° C., in which case the anatase crystals become altered to denser and higher specific gravity titanium oxides, probably rutile.

Therefore it becomes clear that not only have we discovered an improved method for the conversion of a mixture of practically inseparable brookite-rutile-zircon into an easily separable material as well as means for separating same, but we have also discovered incidentally a method of converting brookite and rutile into a synthetic titanium oxide (synthetic anatase) having novel and useful properties entirely different from the titanium oxide minerals from which they were derived.

We do not limit the use of our improved methods to the production of synthetic anatase incidental to the separation of brookite, rutile from zircon, since it will follow that the same methods could be used to convert brookite to anatase even though zircons were not involved.

For example, there occur in this country extensive deposits of brookite in fairly pure form which have not proven as generally useful as rutile, in ceramic stains, etc. Brookite appears of no value, but by adapting our methods to the complete alteration of the brookite into anatase, a new and useful product may be obtained. If, in so doing, it is desired to keep the brookite grains separate during the operation, it is obvious that grains of zircon could be added to the brookite carbon mix before heating.

Although we have stated that a temperature of 1400° to 1600° C. is suitable for the complete conversion, we have found that the reaction begins at about 900° C. and in graphite clay (plumbago) crucibles in a gas fired furnace, a practically complete conversion has been accomplished in 24 to 36 hours. At 1000° C. in about 6 to 8 hours the conversion was good, but as the temperature increases, the rate of reaction increases until at 1400 to 1600° C. a few minutes will suffice.

Temperatures in excess of 1600° C. should be avoided, since the charge will sinter, and the zircon will decompose if the temperatures are too high, which sintering should be avoided. The conditions should be such as to yield a commercially rapid reaction with no sintering and the heated product when cool should contain the grains practically all as separate entities.

Theoretically about 5 to 7 parts of carbon per 100 parts of the ore mixture will suffice, if the conditions are such as occur in the core of an electric resistance furnace, and cooling is completely accomplished in absence of oxygen, although up to 25 parts of carbon per 100 parts of ore may be used without affecting the desired final result. If a gas or oil-fired pot furnace, hearth furnace, or rotary furnace is used for the reaction, the reaction may be carried out in the presence of 5 to 25 parts of carbon per 100 parts of ore, provided the loss of carbon by oxidation to CO$_2$ is prevented before the carbon has been made available for reaction with the titanium oxide minerals.

If after the desired intermediate has been produced, but has been allowed to oxidize at too high a temperature, a dense, and sometimes more or less sintered, product results which, of course, defeats our purpose.

The conditions should be such as to permit the cooling in practically complete absence of oxidation, to temperatures well below 700° C., and then the charge may be oxidized at the desired temperature, namely 700–900° C., when the anatase is produced in the form readily separable from the zircon.

For the production of synthetic anatase in this way a carbon content range from 5 to 25 parts of carbon per 100 parts of ore mixture should suffice, but if a resistance furnace is used in heating the carbon crucibles containing the charge, only enough carbon need be used to effect the desired reactions because of the elimination of unnecessary loss of carbon (due to conditions inherent in resistance furnace) from the reacting mixture by oxidation to CO$_2$ before the carbon is made available for combination with the titanium oxide minerals.

We prefer to use relatively pure forms of carbon, such as calcined petroleum coke, or if extra pure results are desired, powdered graphite or calcined sugar carbon, etc., may be employed.

In case a completely formed fine anatase is not required as the end product, we have found that by mixing the titanium oxide mineral zircon concentrate with about 5 to 25 parts calcined petroleum coke per 100 parts of this concentrate, and then heating the charge at such a temperature— say 1000° C., and for such a period of time for say three hours, as to only partially convert the brookite and rutile crystals to the velvety fissured compound, then only a relatively small conversion will suffice upon calcination at 700–900° C. to produce the titanium oxide grains consisting of brookite and rutile cores (practically unaltered) — with the surfaces of all being synthetic anatase of lower gravity and buoyant porous structure. Such products may be readily separated, and the thereby derived titanium oxide cores of either brookite or rutile with anatase crystal agglomerates forming the surfaces may be obtained for some purposes.

In such cases the intermediate compound may contain less than 1 per cent combined carbon, while in the fully converted material the carbon may be from 5 to 8 per cent in combined form.

Therefore our methods may vary from a very incomplete reacted product separable from the zircon to the fully reacted and formed anatase.

Having so described the nature of our invention, we now present in detail an example showing how it may be industrially practiced.

*Example A*

Beach sands containing zircon, quartz, ilmenite, magnetite, chromite, brookite and rutile, etc., are first subjected to a wet gravity table concentration so as to remove the free silica and any other light minerals separable by such methods. Sufficient water is used to practically complete the removal of salt water in order that the sand obtained by drying the heavy concentrates will remain free-flowing and the mineral grains remain separate. Unless the salt is completely washed out, sintering will occur between 900 and 1600° C.

The dry, free-flowing sand is now passed over an ordinary magnetic separator by means of which the strongly magnetic material is removed, and then over a medium high intensity induction magnetic separator which will serve to completely remove the ilmenite, chromite and any rutile or other titanium oxide mineral having an appreciable iron content.

We have thereby produced a zircon-brookite-rutile concentrate containing approximately as follows:

| | Per cent |
|---|---|
| Zircon | 70 |
| $TiO_2$ | 25 |
| $Fe_2O_3$ | 0.10 |
| Quartz | 2.00 |
| Others | 3.00 |

This product is now passed over a high intensity induction magnetic separator a few times, thus removing and obtaining about 40 to 60% of all the zircon in the form of a relatively pure $ZrSiO_4$ containing about 0.10% $TiO_2$ and about 0.02% iron oxide with small amounts of other impurities.

We have now obtained from this operation a mixture of practically inseparable brookite, rutile and zircon which may contain about 50 to 60 per cent $TiO_2$ and 50 to 40 per cent of zircon.

A charge is made up of 100 parts of the last-mentioned mixture brookite rutile-zircon sand with 25 parts powdered graphite, or more economically powdered calcined petroleum coke, either preferably as fine or finer than the sand, namely about 80 mesh or finer. This charge is well mixed and heated in a carbon crucible or saggers, preferably and most economically in an electric resistance furnace at 1400 to 1600° C., to complete reaction. The charge is then cooled in a reducing atmosphere since, if allowed to oxidize at this high temperature, the desired separation and other advantageous results are not produced.

If the excess carbon is removed completely, the grains will be found to consist of a mixture containing approximately

| | Per cent |
|---|---|
| Titanium (Ti) | 31.00 |
| Oxygen (O) | 18.00 |
| Carbon (C) | 3.00 |
| Zircon ($ZrSiO_4$) | 48.00 |
| | 100.00 |

The cooled product may, if desired, be freed of its free carbon by suitable air separation, etc., or if the coke used was a pure low ash, coke or carbon, the product may be calcined directly in air at 700 to 900° C. to remove the excess carbon by oxidation, while also converting the titanium-oxygen-carbon compound into the synthetic titanium oxide mineral (synthetic anatase).

The result up to this point is a mixture of essentially unaltered zircon grains and the buoyant grains of low specific gravity $TiO_2$ made up now of more or less loosely bonded and very fine crystals of anatase.

By feeding the mixture onto a wet gravity table or onto a dry gravity air table or other suitable device, the titanium oxide agglomerates may be practically and completely separated from the zircon grains.

The mixture of these hereinbefore described products may also be subjected to well known flotation methods to secure ready separation.

For some purposes the agglomerates of fine $TiO_2$ so produced will be useful with no further treatment. By suitable disintegrating devices the agglomerates of $TiO_2$ particles are put into form for use as pigments, stains, welding fluxes, etc. If desired after disintegration, the small amount of zircon or other coarse crystals may be removed by a suitable lawning or sieving operation, a dry bolting machine being ideal for this purpose.

An effective method is to charge the anatase concentrate into a porcelain lined ball mill having porcelain balls, about ½ to 1 inch in diameter, with water, then revolving only long enough to reduce the agglomerates of titanium oxide to a very fine state of sub-division, but leaving the zircon or any other coarse crystals essentially untouched by the milling. It is then possible by suitable dilution to pass the slip through a fine silk bolting cloth or bronze cloth upon which the zircon crystals will remain;—325 mesh or finer lawns may be used.

In case of the separated incompletely converted products, the surface coatings of anatase may be removed, if desired so as to leave as another product the cores of brookite or rutile. If temperature is much over 1000° C. in the reaction with carbon, the brookite cores will probably end up as rutile cores. By this method relatively pure, very fine, light tan-colored pigments may be made.

By our improved methods synthetic anatase ranging from 90 to 98% $TiO_2$ may be obtained with the main impurity $ZrSiO_4$ and $SiO_2$ and with less than ½ of 1% $Fe_2O_3$, usually 0.10 to 0.20% iron.

We claim as our invention:

1. The method of separating an intimate and commingled mixture composed substantially of industrially inseparable grains of titanium oxide minerals and zircon, which comprises heating said mixture in the presence of from 5 to 25 parts of carbon per 100 parts of said ore mixture under reducing conditions at temperatures below 1600° C. but sufficiently high to form a titanium-oxygen-carbon complex from the titanium oxide minerals without altering the zircon grains, then calcining the cooled charge under oxidizing conditions to remove carbon from said complex, and then separating the synthetic titanium oxide material from the zircon.

2. The method of separating an intimate and commingled mixture composed substantially of industrially inseparable grains of titanium oxide minerals and zircon, which comprises heating said mixture in the presence of from 5 to 10 parts of carbon per 100 parts of said ore mixture under reducing conditions at temperatures below 1600° C. but sufficiently high to form a titanium-oxygen-carbon complex from the titanium oxide minerals without altering the zircon grains, then calcining the cooled charge under oxidizing conditions to remove carbon from said complex, and then separating the synthetic titanium oxide material from the zircon.

3. The method of separating an intimate and commingled mixture composed substantially of industrially inseparable grains of titanium oxide minerals and zircon, which comprises heating said mixture in the presence of from 5 to 25 parts of carbon per 100 parts of said ore mixture under reducing conditions between 900° and 1600° C. to form a titanium-oxygen-carbon complex from the titanium oxide minerals without altering the zircon grains, then calcining the cooled charge under oxidizing conditions between 700° C. and 900° C. to remove carbon from said complex, and then separating the synthetic titanium oxide material from the zircon.

4. The method of separating an intimate and commingled mixture composed substantially of industrially inseparable grains of titanium oxide minerals and zircon, which comprises heating said mixture in the presence of from 5 to 10 parts of carbon per 100 parts of said ore mixture under reducing conditions between 900° C. and 1600° C. to form a titanium-oxygen-carbon complex from the titanium oxide minerals without altering the zircon grains, then calcining the cooled charge under oxidizing conditions between 700° C. and 900° C. to remove carbon from said complex, and then separating the synthetic titanium oxide material from the zircon.

5. In the method of obtaining titanium oxide from the separation of an intimate and commingled mixture composed substantially of industrially inseparable grains of titanium oxide minerals and zircon, the steps which consist in bringing said mixture into reaction in the presence of from 5 to 25 parts of carbon per 100 parts of said ore mixture under reducing conditions at temperatures below 1600° C. but sufficiently high to form a titanium-oxygen-carbon complex from the titanium oxide minerals without altering the zircon grains, and then calcining the cooled charge under oxidizing conditions to remove carbon from said complex.

6. In the method of obtaining titanium oxide from the separation of an intimate and commingled mixture composed substantially of industrially inseparable grains of titanium oxide minerals and zircon, the steps which consist in bringing said mixture into reaction in the presence of from 5 to 25 parts of carbon per 100 parts of said ore mixture under reducing conditions between 900° C. and 1600° C. to form a titanium-oxygen-carbon complex from the titanium oxide minerals without altering the zircon grains, then calcining the cooled charge under oxidizing conditions to remove carbon from said complex, then separating the resulting titanium oxide material from the zircon, and finally calcining this titanium oxide material between 1000° C. and 1200° C. to form denser and higher specific gravity titanium oxide.

7. In the method of obtaining titanium oxide from the separation of an intimate and commingled mixture composed substantially of industrially inseparable grains of titanium oxide minerals and zircon, the steps which consist in bringing said mixture into reaction in the presence of from 5 to 25 parts of carbon per 100 parts of said ore mixture under reducing conditions at temperatures below 1600° C. but sufficiently high to form a titanium-oxygen-carbon complex from the titanium oxide minerals without altering the zircon grains, and then calcining the cooled charge under oxidizing conditions between 700° C. and 900° C. to remove carbon from said complex.

8. The method of separating an intimate and commingled mixture composed substantially of industrially inseparable grains of titanium oxide minerals and zircon, which comprises heating said mixture in the presence of from 5 to 25 parts of carbon per 100 parts of said ore mixture under reducing conditions at temperatures below 1600° C. but sufficiently high to form a titanium-oxygen-carbon complex from the titanium oxide minerals without altering the zircon grains, then calcining the cooled charge under oxidizing conditions between 700° C. and 900° C. to remove carbon from said complex, and then separating the synthetic titanium oxide material from the zircon.

9. The method of separating an intimate and commingled brookite-rutile-zircon concentrate composed substantially of industrially inseparable grains, which comprises heating said concentrate in the presence of from 5 to 25 parts of carbon per 100 parts of said concentrate under reducing conditions at temperatures of about 1000° C. for about three hours to partially convert the brookite and rutile crystals into synthetic titanium oxide materials without altering the zircon, then cooling the charge in a reducing atmosphere, then calcining said cooled charge between 700° C. and 900° C. under oxidizing conditions, and finally separating the resulting titanium oxide material from the unaltered zircon.

10. The method of separating an intimate and commingled brookite-rutile-zircon concentrate composed substantially of industrially inseparable grains, which comprises heating said concentrate in the presence of from 5 to 25 parts of carbon per 100 parts of said concentrate under reducing conditions at temperatures of about 1000° C. for about three hours, but without sintering or fusion of the charge, to partially convert the brookite and rutile crystals into synthetic titanium oxide materials without altering the zircon, then cooling the charge in a reducing atmosphere, then calcining said cooled charge between 700° C. and 900° C. under oxidizing conditions, and finally separating the resulting titanium oxide material from the unaltered zircon.

11. The method of separating an intimate and commingled brookite-rutile-zircon concentrate composed substantially of industrially inseparable grains, which comprises heating said concentrate in the presence of from 5 to 25 parts of carbon per 100 parts of said concentrate under reducing conditions at temperatures of about 1000° C. for about three hours to partially convert the brookite and rutile crystals into synthetic titanium oxide materials without altering the zircon, then cooling the charge in a reducing atmosphere, then calcining said cooled charge between 700° C. and 900° C. under oxidizing conditions, and finally separating the resulting titanium oxide grains consisting of brookite and rutile cores from the unaltered zircon.

12. In the method of making a synthetic titanium oxide concentrate from a titanium-oxygen-carbon complex obtained by the heat treatment of titanium oxide minerals in the presence of from 5 to 25 parts of carbon per 100 parts of said minerals under reducing conditions, the step which consists in calcining said complex under oxidizing conditions between 700° C. and 900° C. to form said synthetic titanium oxide concentrate substantially free from carbon.

CHARLES J. KINZIE.
EUGENE WAINER.